Figure 1:
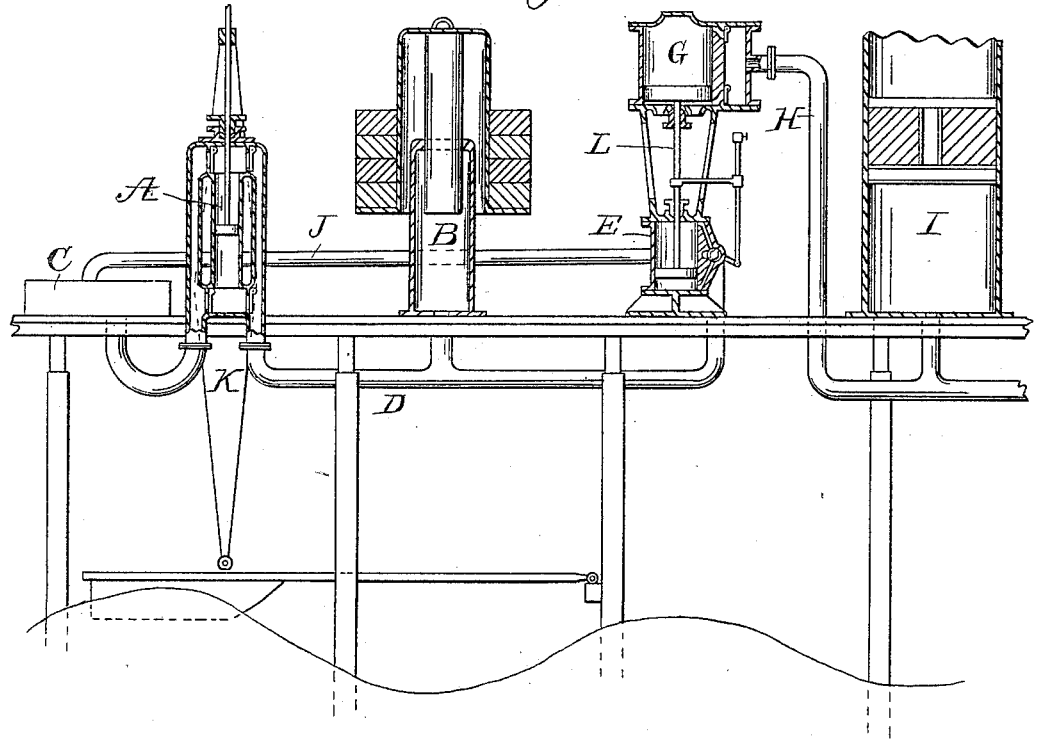

(No Model.)

E. CHAFFEY.
WAVE MOTOR.

No. 426,167. Patented Apr. 22, 1890.

Witnesses
M. C. Galer
James R. Finlayson

Inventor
Elswood Chaffey
by Hazard & Townsend
his Atty

UNITED STATES PATENT OFFICE.

ELSWOOD CHAFFEY, OF SANTA MONICA, CALIFORNIA.

WAVE-MOTOR.

SPECIFICATION forming part of Letters Patent No. 426,167, dated April 22, 1890.

Application filed August 21, 1889. Serial No. 321,548. (No model.)

*To all whom it may concern:*

Be it known that I, ELSWOOD CHAFFEY, a subject of the Queen of Great Britain, residing at Santa Monica, in the county of Los Angeles and State of California, have invented a new and useful Improvement in Wave-Motors, of which the following is a specification.

My invention relates more particularly to the apparatus or system of machinery by means of which I receive, store, convert, and transmit the intermittent reciprocating power of the waves. The great difficulty to be overcome in wave-motors arises from the irregularity of the pulsations of the waves.

My invention consists in transmitting the force of the waves to the machinery to be operated through a liquid medium operating through an interposed hydraulic accumulator.

My improved apparatus consists of a wave-operated float, a volume of liquid, a pump, means for connecting the pump with the float, a hydraulic engine, a conduit connecting the pump with the hydraulic engine, a hydraulic accumulator connected with such pipe or conduit in its intermediate length, and a conduit to conduct the liquid from the exhaust of the engine to the receiving-port of the pump.

The accompanying drawings illustrate the principle of my invention; but it is obvious the several parts of the apparatus shown can be replaced with other parts having similar functions—that is to say, the pump, accumulator, and engine shown can all be replaced by pumps, accumulators, and engines of different styles—without changing the principle of the apparatus.

I am aware that it has been proposed to pump sea-water to an elevated reservoir, from which it may be allowed to descend to operate machinery, and I do not claim such a device as part of my invention. Sea-water is very destructive of machinery, and I purpose to use pure water, or use any other desired liquid. This is made practicable by my invention, as I need to use only a small quantity of liquid, pumping it from a reservoir C by means of a pump A, which is operated by means of rod K, connected with float F. The pump A forces the liquid into the pipe D, which is connected at its other end with a hydraulic engine E and in its intermediate length with a hydraulic accumulator B. The accumulator stores the excess of energy and delivers it to the engine as required. The exhaust-liquid flows back through pipe J into the reservoir C to be again pumped through the machine.

I purpose to use air as a further intermediate medium for the transmission of the power from the wave-float F to the machinery to be operated.

G is an air-compressor connected with and operated by engine E to drive air into pipe H, which is connected in its intermediate length with holder I, which stores the surplus air. Pipe H conducts the air to the machinery to be driven. Many uses for the compressed air besides that of driving machinery may be suggested, such as refrigerating, supplying pure sea-air to buildings in cities, &c.

L is the piston connecting compressor G with engine E. The pump A is made of such length that it will accommodate the longest stroke of the waves at both high and low tide. When a long stroke is made, the surplus water is forced into the accumulator, and when a short stroke occurs the deficiency is supplied from the accumulator, and the operation of engine E is thus made continuous and uniform and the stroke of the pump may be small or great without changing the speed of the engine.

Figure 2:
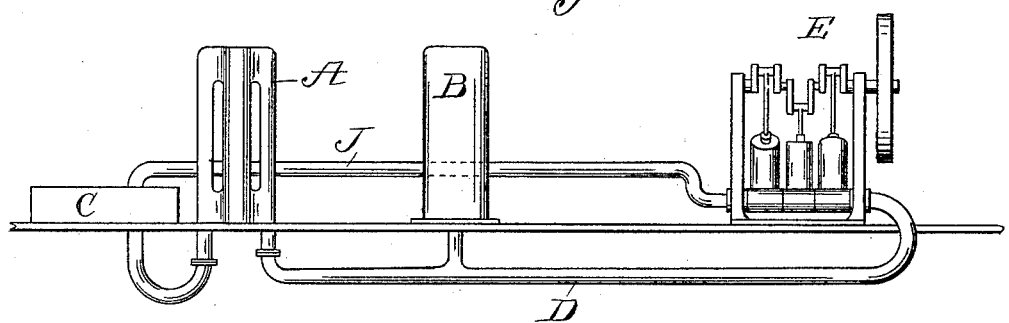

Figures 1 and 2 represent different styles of mechanism for the apparatus.

Now, having described my invention, what I claim as new, and desire to secure by Letters Patent, is—

1. In a wave-motor, the apparatus for transmitting the power from the wave-operated float, comprising a volume of liquid, a pump, means connecting the pump with the float, a hydraulic engine, a pipe connecting the pump with the hydraulic engine, a hydraulic accumulator connected with such pipe in its intermediate length, and a conduit to conduct the liquid from the exhaust of the engine to the receiving-port of the pump.

2. In a wave-motor, the apparatus for transmitting the power from the wave-operated float, comprising a volume of liquid, a pump, means connecting the pump with the float, a hydraulic engine, a pipe connecting the pump with the hydraulic engine, a hydraulic accumulator connected with such pipe in its intermediate length, a conduit to conduct the liquid from the exhaust of the engine to the receiving-port of the pump, an air-compressor, and means connecting the same with the engine, for the purpose set forth.

ELSWOOD CHAFFEY.

Witnesses:
JAMES R. TOWNSEND,
ELIZA C. CHAFFEY.